United States Patent
Sanchez Ribes et al.

(10) Patent No.: US 10,987,864 B2
(45) Date of Patent: Apr. 27, 2021

(54) FLUSHING A FLUID EJECTION DEVICE

(71) Applicant: HEWLETT-PACKARD DEVELOPMENT COMPANY, L.P., Fort Collins, CO (US)

(72) Inventors: Salvador Sanchez Ribes, Barcelona (ES); Jeffrey Wagner, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 119 days.

(21) Appl. No.: 16/315,261

(22) PCT Filed: Oct. 19, 2016

(86) PCT No.: PCT/US2016/057722
§ 371 (c)(1),
(2) Date: Jan. 4, 2019

(87) PCT Pub. No.: WO2018/075031
PCT Pub. Date: Apr. 26, 2018

(65) Prior Publication Data
US 2019/0240910 A1   Aug. 8, 2019

(51) Int. Cl.
*B29C 67/00* (2017.01)
*B29C 64/35* (2017.01)
(Continued)

(52) U.S. Cl.
CPC .......... *B29C 64/35* (2017.08); *B29C 64/209* (2017.08); *B29C 64/386* (2017.08);
(Continued)

(58) Field of Classification Search
CPC .......... B33Y 10/00; B33Y 30/00; B33Y 50/00; B33Y 50/02; B29C 64/35; B29C 64/209
See application file for complete search history.

(56) References Cited

U.S. PATENT DOCUMENTS 5,594,652 A    1/1997  Penn et al.
7,306,758 B2   12/2007 Nielsen et al.
(Continued)

FOREIGN PATENT DOCUMENTS

CN    1780706     5/2006
CN    104190664   12/2014
(Continued)

OTHER PUBLICATIONS

Sharma, R.K. et al., Inkjet Assisted Micro-scale Cooling of Electronics Enabling Device Compaction by Efficient Thermal Management, 2005.

*Primary Examiner* — Ryan M Ochylski
(74) *Attorney, Agent, or Firm* — Samson & Partner

(57) ABSTRACT

A fluid ejection device controller for controlling a fluid ejection device of a three dimensional printing system has a processor and a memory. The memory includes executable instructions that when executed by the processor causes the fluid ejection device controller to control a motion of the fluid ejection device to print agent onto a layer of build material in a build area; and to flush agent through at least one nozzle of the fluid ejection device in response to detecting, by the fluid ejection device controller, an erroneous stopping of the motion of the fluid ejection device and the fluid ejection device being positioned on top of the build area.

10 Claims, 2 Drawing Sheets

(51) Int. Cl.
  *B33Y 50/02*    (2015.01)
  *B33Y 40/00*    (2020.01)
  *B29C 64/209*   (2017.01)
  *B29C 64/393*   (2017.01)
  *B29C 64/386*   (2017.01)

(52) U.S. Cl.
  CPC ............ *B29C 64/393* (2017.08); *B33Y 40/00* (2014.12); *B33Y 50/02* (2014.12)

(56) References Cited

U.S. PATENT DOCUMENTS

| | | |
|---|---|---|
| 8,033,811 B2 | 10/2011 | Swanson et al. |
| 8,128,188 B2 | 3/2012 | Muela et al. |
| 9,162,453 B2 | 10/2015 | Cruz-Uribe et al. |
| 2002/0093546 A1 | 7/2002 | Johnson |
| 2014/0345521 A1 | 11/2014 | Silverbrook |
| 2015/0137402 A1 | 5/2015 | Schmehl et al. |
| 2015/0266238 A1 | 9/2015 | Ederer et al. |
| 2015/0273912 A1 | 10/2015 | Derleth et al. |

FOREIGN PATENT DOCUMENTS

| | | |
|---|---|---|
| CN | 104290325 A | 1/2015 |
| CN | 204149546 U | 2/2015 |
| CN | 105252770 | 1/2016 |
| CN | 105479944 | 4/2016 |
| CN | 105856572 | 8/2016 |
| EP | 2572865 A1 | 3/2013 |
| EP | 2955004 | 12/2015 |

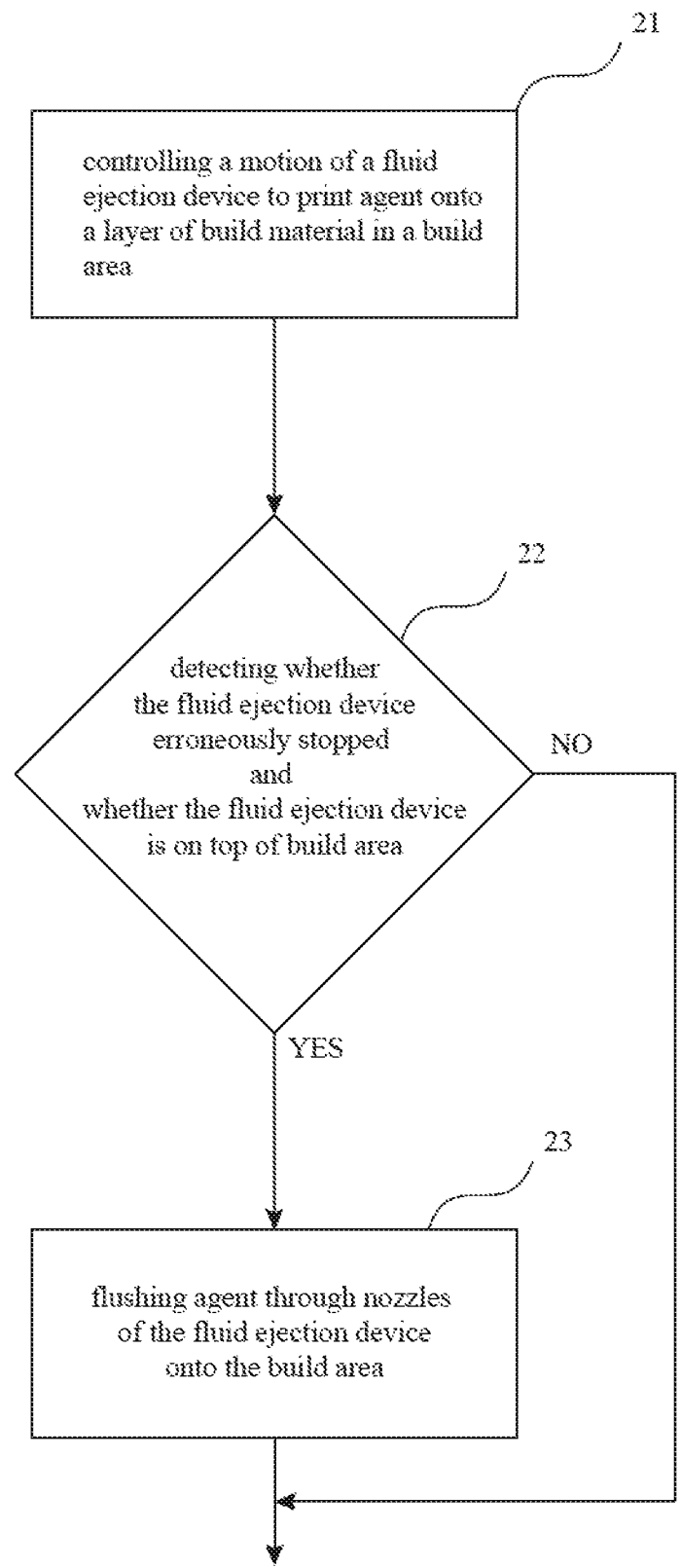

FLUSHING A FLUID EJECTION DEVICE

BACKGROUND

Some three dimensional printing systems print three-dimensional objects by printing agent onto a layer of build material and heating the build material layer whereby the particles of build material moistened with agent fuse.

BRIEF DESCRIPTION OF THE DRAWINGS

Examples will be described, by way of example only, with reference to the accompanying drawing in which corresponding reference numerals indicate corresponding parts and in which:

FIG. 2 shows a block diagram of an example method for controlling the fluid ejection device of the three dimensional printing system.

Figure 1:
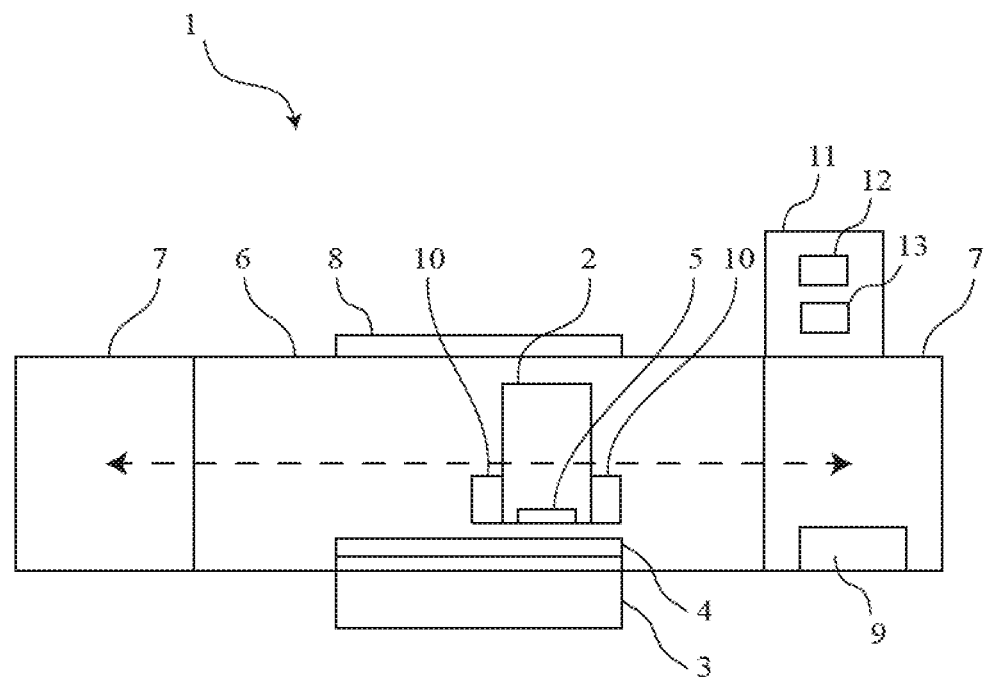
FIG. 1 is an illustration of a three dimensional printing system with a fluid ejection device to print agent onto a build material layer on a build area in a hot area of the three dimensional printing system.

Moreover the drawings provide examples and or implementations consistent with the description; however, the description is not limited to the examples and/or implementations provided in the drawings.

DETAILED DESCRIPTION

The description refers to controlling a fluid ejection device, of which, some examples may be referred to as 3D printer. The description further refers to a fluid ejection device controller and to a three dimensional printing system.

An example three dimensional printing system prints an agent onto a layer of build material in a build area of the printer. The printer heats the build material layer to fuse the particles of build material moistened by the agent, whereas non-moistened particles of build material remain unfused. This may be repeated multiple times layer by layer in that a further build material layer is deposited on top of a previous layer, agent is printed onto the further layer and this layer is heated to fuse the moistened particles of build material of this layer and so on. Thereby, a 3D object may be formed, i.e., printed by the three dimensional printing system.

Temperatures in the area of the build area may be high, as, for example, the fusing of the build material is performed by heating. While regularly printing, high temperatures in the area of the build area are less problematic for the fluid ejection device, because the short times spent above the build area. However, for example, a system failure of the printer may occur leaving the fluid ejection device stopped on top of the hot build area, which, for example, has temperatures higher than 150° c. Staying, e.g. more than one minute, on top of the hot build area and close to it, e.g. around 3 mm above a surface of a topmost build material layer, may dry out the agent at the nozzles and clog them. Even worse, the high temperature may push the fluid ejection device surface temperature beyond a boiling point of the agent and boil agent inside the nozzles and adjacent fluidics.

An example method of controlling the fluid ejection device of the three dimensional pricing system includes controlling a motion of the fluid ejection device to print agent onto the (topmost) layer of build material in the build area. Controlling the fluid ejection device further includes flushing agent through at least one nozzle of the fluid ejection device in response to detecting an erroneous stopping of the motion of the fluid ejection device and the fluid ejection device being positioned on top of the build area (i.e. the step of flushing agent is carried out when both conditions are fulfilled at the same time).

The example method may prevent from clogging of the fluid ejection device's nozzles in situations when the fluid ejection device unintentionally stops in an area of the build area. Flushing agent through one or more nozzles of the fluid ejection device may produce a cooling effect on the fluid ejection device, e.g. by fresh cool agent entering the fluid ejection device and/or by cooling down the surface of the build material under the fluid ejection device by agent discharged from the nozzles when flushing. Flushing agent when the fluid ejection device is positioned on top of the build area prevents from the fluid ejection device dispensing agent on other members than the build area that may not be prepared for it. For example, the surface of the build material under the fluid ejection device is cooled down from the bed temperature to a temperature that reduces the agent evaporation to normal levels. The example method allows for increasing the life span of the fluid ejection device by overcoming the effects of system failure events by means avoiding the nozzle clogging in these circumstances.

For example, the agent includes an agent, e.g. to solidify or color particles of build material moistened with agent. For example, the agent includes one or more of, e.g., a fusing agent, a binding agent, a detailing agent, a coloring agent and/or a conductivity changing agent.

In some examples, the agent includes the binding agent to stick together particles of build material. By heating the build material layer the curing process is accelerated to reduce or avoid any waiting times before printing the next layer, for example. In some examples, the build area is heated up to temperatures of at least 80° C., 100° C., 120° C. or 150° C. To avoid degradation of the build material, in some embodiments the temperature of the build material layer is controlled to not exceed 130° C., 160° C., 180° C. or 200° C.

In some examples, the agent includes the fusing agent with (high) infrared (IR) absorption capacity. This allows for sintering, i.e. melting together particles of build material moistened with agent by applying (e.g. from an IR light source) heat radiation to the build material layer. The fusing agent highly absorbs the heat radiation thereby heating up the agent moistened particles of build material above their meting point, whereas non-moistened particles of build material absorb less heat radiation and do not reach their melting point.

In some examples, flushing includes spitting, i.e. controlling the fluid ejection device to dispense agent by one or more nozzles at a reasonably low frequency. Spitting agent onto the surface of the build material layer cools down the build material layer. This reduces heating of the fluid ejection device by heat originating from the build material layer. Spitting may be performed by the same technique as usually printing agent is performed by the fluid ejection device. Spitting also reduces clogging by replacing the drying agent in the nozzles by fresh agent. Furthermore, spitting agent dispenses (heated up) agent from the fluid ejection device and, thereby, transports away heat from the print head. However, in some printing techniques, e.g. thermal printing, the spitting heats up the fluid ejection device, i.e. spitting may cause self-heating of the fluid ejection device. In such situations, cooling down the build area is the main cooling effect of spitting agent, for example.

In some examples, flushing includes priming the fluid ejection device. For example, priming includes pressurizing an agent reservoir and pumping agent under pressure through the fluid ejection device out of the nozzles. Like spitting, also priming dispenses (heated up) agent from the fluid ejection device and let (colder) fresh agent flow to the fluid ejection device from the agent reservoir to transport away heat from the print head. Flushing the fluid election device by printing may achieve a higher throughput of agent through the fluid ejection device and, thereby, achieving a stronger cooling effect in comparison with spitting. Also priming cools down the build material layer by flushing the agent from the fluid ejection device onto the surface of the build material layer. The priming does not heat up the fluid ejection device. For example, the fluid ejection device can be (electrically) shut down for flushing to reduce the self-heating of the fluid ejection device.

In some examples, the fluid ejection device may be controlled to spit a certain quantity of agent. In some examples, the fluid ejection device may be controlled to perform priming for a certain period of time. This allows for not to use up all the agent in the agent reservoir at a system failure event.

To reduce clogging of the nozzles and/or for a maximum throughput of agent, in some examples, all nozzles of the fluid ejection device are flushed. For example, some or all nozzles of the print head are flushed in turn. This enables a more continuous heat transport away from the fluid ejection device while keeping the quantity of the flushed agent lower than when (continuously) flushing all nozzles in parallel. To increase the cooling effect, in some examples the fluid ejection device is controlled to flush agent with two or more or even all nozzles at the same time. In some examples, the fluid ejection device is controlled to increase the frequency of spitting agent to increase the cooling effect.

In some examples, the three dimensional printing system is equipped with a position detector to detect whether the fluid ejection device is located in the area, e.g. on top, of the build area. In some examples, the flushing agent through the fluid ejection device is only carried out, if the position of the fluid ejection device is detected to be on top of the build area. This protects the three dimensional printing system to be contaminated with agent at other places than the build area in system failure situations when the fluid ejection device unintentionally stops, e.g. outside a parking position for the fluid election device.

In some examples, the internal of the three dimensional printing system, e.g. the area of the build area, is also cooled by a (further) cooling system. For example, the internal of the three dimensional printing system is vented by cool environmental air. This can reduce the heating up of the stopped fluid ejection device and also reduce the quantity of agent to be flushed through the fluid ejection device for cooling the fluid ejection device.

Now referring to FIG. 1, an example three dimensional printing system 1 to print three dimensional objects has and a fluid ejection device 2 to print agent onto a layer of build material 4 in a build area 3. The three dimensional printing system further has a fluid ejection device controller 11 for controlling the fluid ejection device 2. The fluid ejection device controller 11 is equipped with a processor 12 and a memory 13, the memory 13 includes executable instructions that when executed by the processor 12 causes the fluid ejection device controller 11 to control a motion of the fluid ejection device 2 to print agent onto the layer of build material 4 in a build area 3.

The example three dimensional printing system 1 generates 3D objects in a layer wise manner, wherein each layer represents a cross-section at a particular height of the 3D object to be printed. To generate the 3D object, the three dimensional printing system 1 prints a cross-sectional image corresponding to a certain height-level of the 3D object to be printed onto the build material layer 4. Particles of build material onto which agent is printed (i.e. which are moistened with agent) agglomerate. Then a further layer of build material is provided on top of the previous layer of build material and the printer 1 prints a further cross-sectional image corresponding to a next height-level of the 3D object to be printed onto this further layer. This enables the three dimensional printing system 1 to print 3D objects layer by layer—so to say the object to be printed grows up from the build are 3. The printed 3D object is built of agglomerated particles of build material which are embedded in surrounding loose particles of build material on which no agent has been printed. Removing the loose particles of build material e.g. by brushing or blowing, leaves the desired 3D object.

A respective cross-sectional image of the 3D object is printed by discharging agent from nozzles 5 of the fluid ejection device 2 while moving the fluid ejection device 2 over the build area 3 with the build material layer 4. The fluid ejection device 2 has at least one row of nozzles 5 to print a swath of agent each time the fluid ejection device 2 crosses the build area 3. For example, the fluid ejection device 2 has two, three or four rows of nozzles 5. In some examples, a first row of nozzles 5 is for printing a first agent and a second row of nozzles 5 is for printing a second agent. In some examples, the fluid ejection device 2 has a third row of nozzles 5 to print a third agent and, in some of these examples, the fluid ejection device 2 has a fourth row of nozzles 5 to print a fourth agent.

In some examples, the three dimensional printing system is a scanning type printer, i.e. an image is printed onto a build material layer by printing several swaths, e.g. by performing (controlled by the fluid ejection device controller 11) a scanning like back and forth motion of the fluid ejection device while moving the build area in a direction transverse to the back and forth motion of the fluid ejection device after printing a swath. This allows for printing 3D objects having a minimum cross-sectional diameter larger than the length of the row of nozzles of the fluid ejection device.

In some examples, the three dimensional printing system is a page wide printer, i.e. the length of the row of nozzles has a length which corresponds to a maximum cross-sectional diameter of printable 3D objects in a direction transverse to the back and forth motion of the fluid ejection device. This allows for fast 3D printing, since the fluid ejection device can print a completed cross-sectional image onto the build material layer by a single motion crossing the build area.

Turning back to the example illustrated in FIG. 1, the three dimensional printing system 1 has a hot area 6 arranged between adjacent opposite cold areas 7. For example, (controlled by the fluid ejection device controller 11) during printing the fluid ejection device 2 performs a back and forth motion from one cold area 7 to the other (opposite) cold area 7 (and vice-versa) traversing the hot area 6 and, thereby, crossing the area of the build area 3 arranged in the hot area 6 to print agent onto the (topmost) build material layer 4. A pre-heater 8 is arranged in the hot area 6 to heat up the build area 3 and the build material layer 4 to a certain (pre-heating) temperature. For example, the pre-heater 8 has a resistor heating element or an IR light source to heat the hot area 6. However, to not unnecessarily degrade the build material on the build area 3, pre-heating heats up the build area 3 and the build material layer 4 to (pre-heating) temperatures below a working temperature, i.e. a temperature at which the agglomeration of agented particles of build material efficiently performs.

To heat up the (topmost) build material layer 4 to the working temperature, the fluid ejection device 2 is equipped with one or two or multiple heaters 10 for locally heating the build material layer 4 immediately before or immediately after or immediately before and after printing agent onto the build material layer 4. In some examples, the heater(s) are mounted at a carriage, which also carries the fluid ejection device 2. For example, one or multiple heaters 10 are arranged at either side of the fluid ejection device 2 with regard to the direction of the back and forth motion of the fluid ejection device 2. Using these heater(s) 10, which travel with the fluid ejection device 2, the build material layer 4 is momentarily heated up to the working temperature for agglomerating the particles of build material moistened with agent. Pre-heating the build material layer 4 supports the agglomeration of the particles of build material in that the required temperature step to heat up the build material layer 4 to the working temperature by the heater(s) 10 can be reduced. This allows for faster printing, for example.

For example, the agent includes one or more agents, e.g. a fusing agent, a binding agent, a detailing agent, a coloring agent and/or a conductivity changing agent.

The fusing agent has a higher infrared (IR) absorption capacity than the particles of build material. When the three dimensional printing system 1 applies heat radiation, e.g. by the heater(s) 10, onto the build material layer 4 and the particles of build material moistened with the fusing agent heat up to higher temperatures as particles of build material not moistened with the fusing agent, as the fusing agent absorbs more heat radiation than the (pure) particles of build material. This allows for heating up the moistened particles of build material to a working temperature above their melting point and, thereby, melting them together, whereas non-moistened particles of build material stay below their melting point and do not agglomerate.

As to the binding agent, particles of build material on which agent has been printed are, thus, moistened with the binding agent. This binding agent hardens (in short time) when exposed to the working temperature and, thereby, clues together that particles of build material onto which agent has been printed. 3D objects can be printed by the three dimensional printing system 1 in that the three dimensional printing system 1 prints cross-sectional structures of the desired 3D object onto the build material layer 4, wherein the particles of build material moistened by the agent solidify under heat.

Exposing the fluid ejection device 2 to high temperatures heats up the fluid ejection device 2 and can reduce its lifetime. For example, the agent in the fluid ejection device 2, in particular in the nozzles 5, may dry or boil if the fluid ejection device 2 is heated up to too high temperatures. In regular printing operation, the fluid ejection device 2 resides in the hot area 6 for short periods of times only, namely while moving from one cold area 7 to the other cold area 7 and thereby crossing the hot area 6 to print agent onto the build material layer 2. This prevents the fluid ejection device 2 from overheating in regular operation. For example, one of the cold areas 7 or both cold areas 7 are equipped with a parking assembly 9 to cover the nozzles 5, e.g. to protect them from drying out. For example, in time periods between printing different 3D objects and/or while applying a new or further build material layer onto the build area 3, the fluid ejection device 2 stays in (one of) the cold areas 7 and rests at the parking assembly 9. In the cold areas 7 the fluid ejection device 7 can stay at non-critical temperatures or can cool down after having visited the hot area 6.

Therefore, in a regular printing situation, high temperatures in the hot area 6 are less problematic for the fluid ejection device 2, because the short times spent in the hot area 6, in particular above the hot build area 3. However, for example, a system failure of the three dimensional printing system 1 may occur leaving the fluid ejection device 2 unintentionally stopped in the hot area 6. Staying there may dry out the agent in the nozzles 5 and clog them.

The example method of controlling the fluid ejection device 2 of the three dimensional printing system 1 illustrated in FIG. 2 provides prevention from clogging of the fluid ejection device's nozzles 5, e.g. in situations when the fluid ejection device 2 unintentionally stops in the hot area 6 above the (hot) build area 3. The memory of the fluid ejection device controller 11 includes executable instructions that when executed by the processor of the fluid ejection device controller 11 causes the fluid ejection device controller 11 to perform the example method illustrated in FIG. 2.

The example method includes controlling, in block 21, by the controller 11, a motion of the fluid ejection device 2 to print agent onto the layer of build material 4 while crossing the build area 3. This corresponds to a regular printing situation, for example.

The example method further includes detecting, in block 22, by the controller 11, whether an erroneous stopping of the motion of the fluid ejection device 2 has occurred and whether the fluid ejection device 2 is (actually) positioned on top of the build area 3 in the hot area 6. In the example method, these two conditions must be fulfilled in order to perform block 23 described below.

The example method further includes controlling, in block 23, by the controller 11, the fluid ejection device 2 to flush agent, e.g. through at least one nozzle 5, through all nozzles of a row of nozzles or through all nozzles of all rows of nozzles of the fluid ejection device 2.

Therefore, flushing is performed in response to detecting an erroneous stopping of the motion of the fluid ejection device and the fluid ejection device being positioned on top of the build area. This allows for preventing the fluid ejection device 2 from discharging agent within the hot area 6 on other parts of the three dimensional printing system 1 than the build area 3.

Flushing agent through one or more nozzles 5 of the fluid ejection device 2 causes a cooling effect on the fluid ejection device 2, e.g. by fresh cool agent entering the fluid ejection device 2 and by cooling down the surface of the build material layer 4 under the fluid ejection device 2 by agent discharged from the nozzles 5 when flushing. The example method allows for increasing the life span of the fluid ejection device by overcoming the effects of system failure events by means avoiding the nozzle clogging in these circumstances.

For example, the flushing, in block 23, includes spitting agent by the nozzles 5 onto the build material layer 4. Spitting agent means discharging agent at low frequencies from one ore more nozzles 5. This replaces old (warmed up) agent by fresh (cooler) agent from, e.g. retrieved from an agent cartridge. For example, a main cooling effect of spitting agent is cooling down the build material layer 4 in the area of the fluid ejection device 2. For a higher cooling effect, the flushing, in block 23, includes priming the fluid ejection device 2, for example. In priming the fluid ejection device 2 the throughput of agent through the fluid ejection device 2 (and the nozzles 5) is higher than with spitting agent. The higher throughput of agent increases the cooling effect as more fresh (cool) agent is passed to the fluid ejection device 2. Also more agent is discharged onto the build material layer 4 by priming, which therefore cools down even faster. For example, the priming is performed by applying an air pressure to the agent system to blow out agent through the nozzles 5. This reduces or avoids self-heating of the fluid ejection device 2 during flushing.

Controlling, in block 23, the fluid ejection device 2 to flush agent through the nozzles is accompanied with a consumption of fresh agent obtained from a reservoir, e.g. the agent cartridge. To avoid an undue high consumption of agent, the fluid ejection device 2 is controlled, by the fluid ejection device controller 11, to spit, in block 23, (only) a certain quantity of agent, for example. For the same reason, in some examples, the fluid ejection device 2 is controlled, by the controller 11, to perform in block 23, printing for a certain period of time (only). Agent consumption for flushing can be further controlled in that only a single nozzle, only some of the nozzles or all nozzles 5 are flushed at a time.

Although some examples of methods and products have been described herein, other variations are generally within the scope of this description. As will be appreciated, the description generally contemplates various implementations fairly falling within the scope of the appended claims either literally or under the doctrine of equivalents.

The invention claimed is:

1. A fluid ejection device controller for controlling a fluid ejection device of a three dimensional printing system, the fluid ejection device controller comprising a processor and a memory, the memory comprises executable instructions that when executed by the processor causes the fluid ejection device controller:
    to control a motion of the fluid ejection device while print agent is printed onto a layer of build material in a build area; and
    to flush agent through at least one nozzle of the fluid ejection device in response to detecting, by the fluid ejection device controller, an erroneous stopping of the motion of the fluid ejection device with the fluid ejection device positioned on top of the build area.

2. The fluid ejection device controller according to claim 1, wherein the agent comprises at least one of a fusing agent, a binding agent, a detailing agent, a coloring agent and a conductivity changing agent.

3. The fluid ejection device controller according to claim 1, wherein to flush agent comprises to spit agent.

4. The fluid ejection device controller according to claim 3, wherein to spit agent comprises to spit a certain quantity of agent.

5. The fluid ejection device controller according to claim 1, wherein to flush agent comprises to prime the fluid ejection device.

6. The fluid ejection device controller according to claim 1, wherein to prime the fluid ejection device comprises to prime the fluid ejection device for a certain period of time.

7. The fluid ejection device controller according to claim 1, wherein the controlling a fluid ejection device comprises at least one row of nozzles.

8. The fluid ejection device controller according to claim 7, wherein to flush agent comprises to flush agent through al nozzles of the fluid ejection device.

9. A three dimensional printing system comprising:
    a fluid ejection device; and
    a fluid ejection device controller for controlling the fluid ejection device;
    wherein the fluid ejection device controller comprises a processor and a memory, the memory comprises executable instructions that when executed by the processor causes the fluid ejection device controller:
        to control a scanning motion of the fluid ejection device;
        to print agent onto a layer of build material in a build area; and
        to flush agent through at least one nozzle of the fluid ejection device in response to detecting, by the fluid ejection device controller, an erroneous stopping of the scanning motion of the fluid ejection device and the fluid ejection device being positioned on top of the build area.

10. A method of controlling a fluid ejection device of a three dimensional printing system, the method comprising:
    controlling a back and forth motion of the fluid ejection device while print agent is printed onto a layer of build material in a build area; and
    in response to detecting an erroneous stopping of the back and forth motion of the fluid ejection device with the fluid ejection device positioned top above of the build area, flushing agent through at least one nozzle of the fluid ejection device.

* * * * *